(12) United States Patent
Cook

(10) Patent No.: US 11,234,384 B2
(45) Date of Patent: Feb. 1, 2022

(54) SLOW-RELEASE IRRIGATION DEVICE FOR INDIVIDUAL PLANTS

(71) Applicant: Nicholas J. Cook, Saint Paul, MN (US)

(72) Inventor: Nicholas J. Cook, Saint Paul, MN (US)

( * ) Notice: Subject to any disclaimer, the term of this patent is extended or adjusted under 35 U.S.C. 154(b) by 94 days.

(21) Appl. No.: 16/814,638

(22) Filed: Mar. 10, 2020

(65) Prior Publication Data

US 2021/0282342 A1 Sep. 16, 2021

(51) Int. Cl.
*A01G 29/00* (2006.01)
*A01G 27/00* (2006.01)

(52) U.S. Cl.
CPC .......... *A01G 29/00* (2013.01); *A01G 27/006* (2013.01)

(58) Field of Classification Search
CPC .............................. A01G 29/00; A01G 27/006
USPC ......................................................... 47/48.5
See application file for complete search history.

(56) References Cited

U.S. PATENT DOCUMENTS

| | | | | |
|---|---|---|---|---|
| 3,856,205 A | * | 12/1974 | Rohling | A01G 27/006 239/63 |
| 4,038,780 A | * | 8/1977 | Bruno | A01G 31/02 47/63 |
| 4,653,529 A | * | 3/1987 | Freeman | A01G 27/001 137/453 |
| 4,698,135 A | * | 10/1987 | Raab | B01D 71/36 202/234 |
| 4,829,708 A | | 5/1989 | Gonzalez | |
| 4,865,640 A | | 9/1989 | Avera | |
| 4,885,870 A | | 12/1989 | Fong | |
| 4,970,823 A | | 11/1990 | Chen et al. | |
| 5,009,028 A | * | 4/1991 | Lorenzana | A47G 33/12 119/77 |
| 5,405,058 A | | 4/1995 | Kalis | |
| 6,052,942 A | | 4/2000 | Chu | |
| 6,131,333 A | | 10/2000 | Andu | |
| 6,138,408 A | | 10/2000 | Paternoster et al. | |
| 6,243,986 B1 | | 6/2001 | Crowley | |

(Continued)

FOREIGN PATENT DOCUMENTS

| CA | 2208284 A1 | * | 12/1998 | ........... A01G 27/006 |
|---|---|---|---|---|
| DE | 9305997 U1 | * | 9/1993 | ........... A01G 27/006 |
| EP | 0195542 A1 | * | 9/1986 | ............. A01G 27/06 |

OTHER PUBLICATIONS

English-language translation of DE 9305997 U1 (Year: 1993).*

*Primary Examiner* — Lisa L Tsang
(74) *Attorney, Agent, or Firm* — Johnson and Phung LLC; Thomas N. Phung

(57) ABSTRACT

A slow-release irrigation device having a housing with an open and closed end, and a water reservoir located therein, a circumferential channel located proximal to the open end providing a watertight engagement with a neck opening of a beverage container, a water channel connected to the water reservoir and having a water receiving inlet and an outlet for directing water into the water reservoir while simultaneously operating as a water seal for the housing, a housing water outlet located between the ends of the housing and directly connecting the water reservoir with the external environment, an air channel located within the housing, an air tube connecting the water reservoir to an interior of the container; and a permeable membrane located within the air channel and controlling the passage of air through an air outlet of the air tube.

17 Claims, 3 Drawing Sheets

(56) References Cited

U.S. PATENT DOCUMENTS

| | | | |
|---|---|---|---|
| 6,502,725 B1 * | 1/2003 | Alexander | B67D 1/0456 |
| | | | 222/105 |
| 6,684,563 B2 | 2/2004 | Wu | |
| 6,766,614 B2 * | 7/2004 | Teufel | A01G 27/003 |
| | | | 137/391 |
| 6,848,483 B1 * | 2/2005 | Atkinson | A01G 27/02 |
| | | | 137/393 |
| 7,240,457 B1 | 7/2007 | Chang | |
| 7,752,807 B2 | 7/2010 | Wu | |
| 7,845,110 B2 | 12/2010 | Amsellem | |
| 9,675,013 B2 * | 6/2017 | Balestra | A01G 27/02 |
| 2001/0023555 A1 * | 9/2001 | Buss | A01G 29/00 |
| | | | 47/48.5 |
| 2002/0020111 A1 | 2/2002 | Rosenberg | |
| 2011/0219685 A1 | 9/2011 | Goldman | |

\* cited by examiner

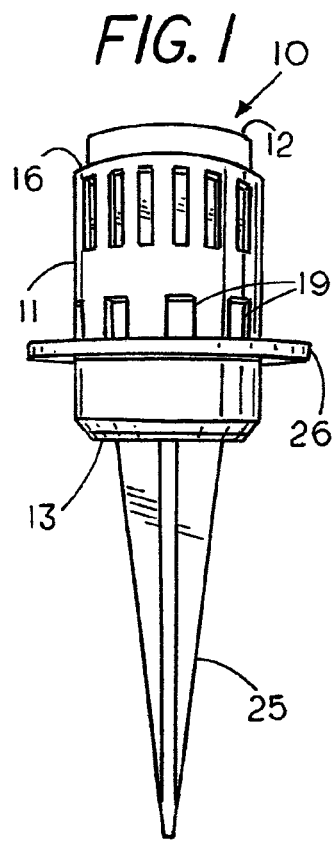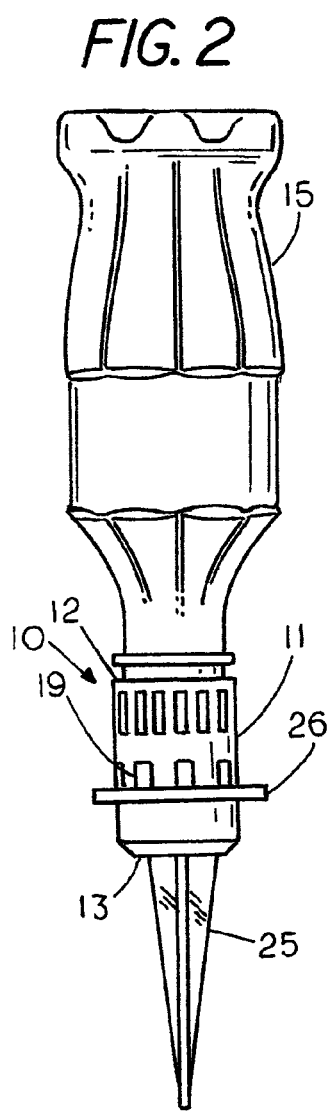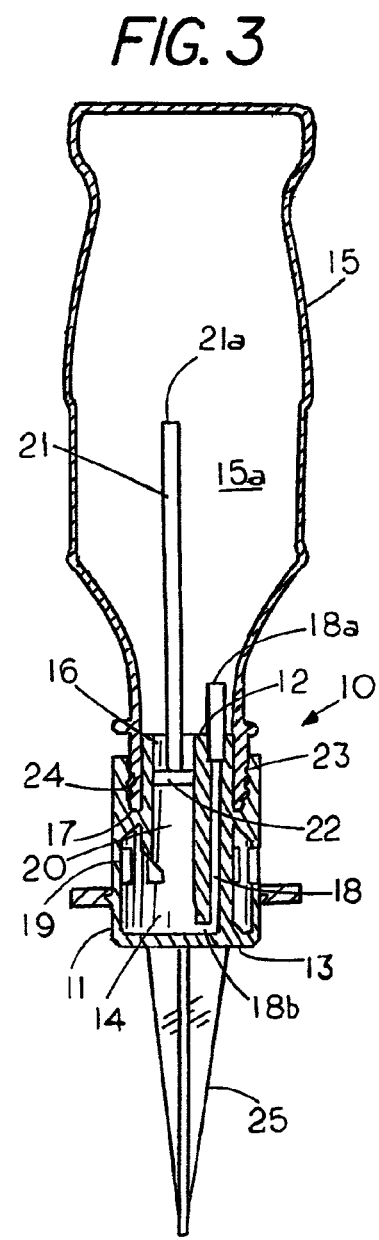

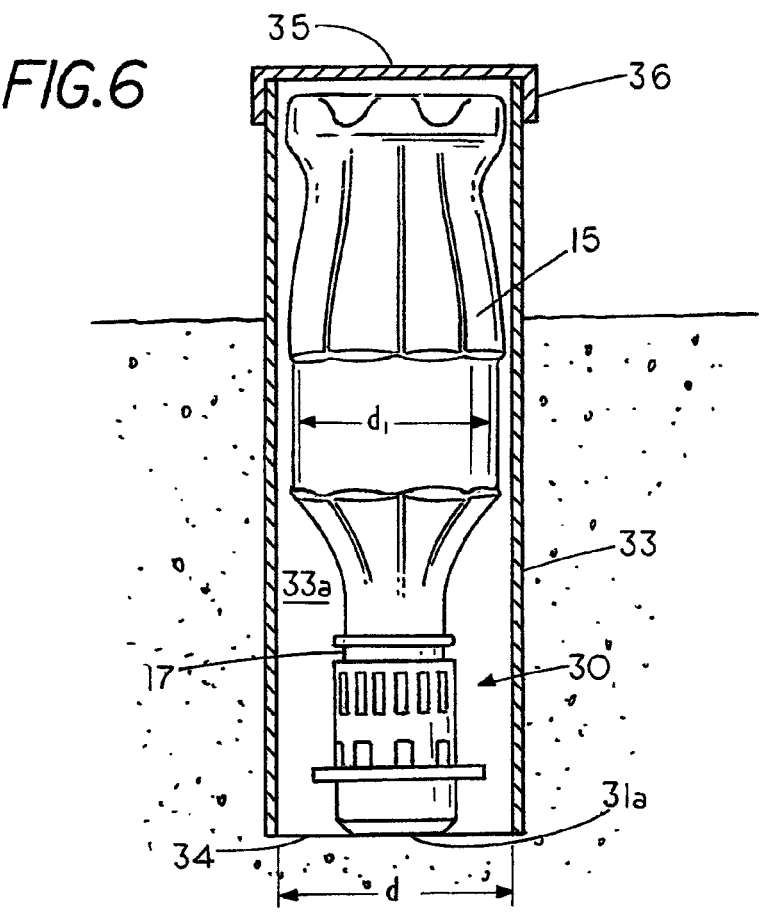
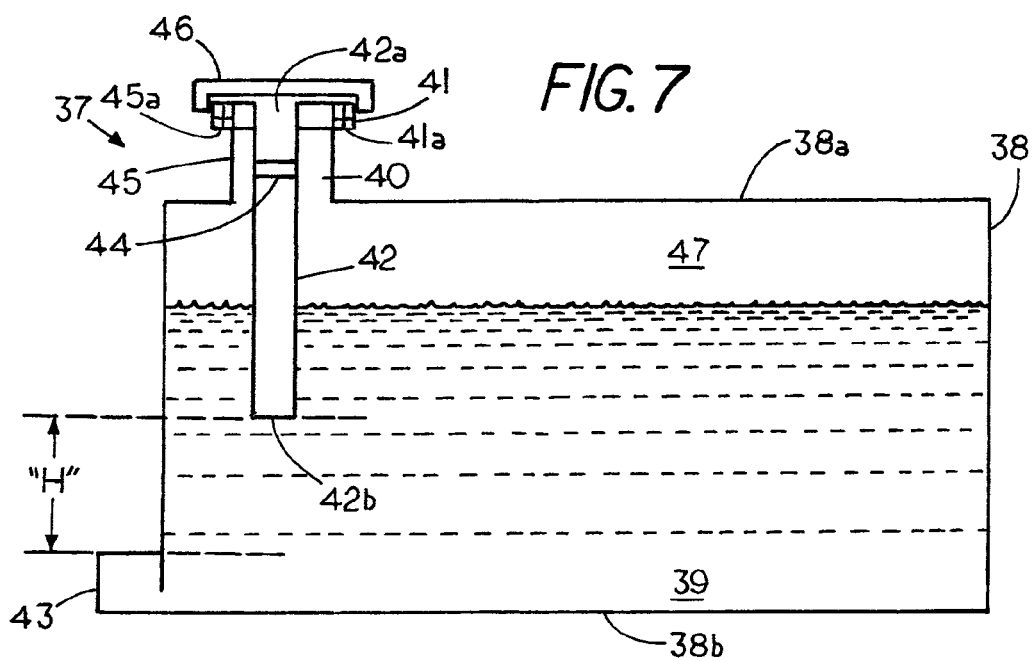

SLOW-RELEASE IRRIGATION DEVICE FOR INDIVIDUAL PLANTS

FIELD OF THE INVENTION

This invention relates generally to plant irrigation devices and, more specifically to a slow-release irrigation device which may incorporate used or recycled common blow molded container to assist in watering individual plants.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

It has been proven that slow delivery of water to plants to match the rate that they can absorb enables growth with very small quantities, by minimizing the amount that is normally lost to lost to run off and absorption into the soil. Furthermore, continuous availability of water maximizes plant growth by allowing photosynthesis to take place whenever light is available. The present invention attempts to deliver both slow delivery and continuous availability of water to maximize the growth, using a minimum of water, while utilizing used beverage bottles which would otherwise be waste.

SUMMARY OF THE INVENTION

Briefly, the present invention comprises a slow-release irrigation device for individual plants that includes a housing having an open end, a closed end, and a water reservoir located within the housing. The housing includes a circumferential channel located proximal to the open end of the housing with the circumferential channel providing a watertight engagement with a neck opening of a common blow molded beverage container such as those that are used for soft drinks, water and beer.

The housing contains a water channel connected to the water reservoir with the water channel having an inlet for receiving water into the water channel and an outlet for directing water from the water channel into the water reservoir with the outlet simultaneously operating as a water seal for the housing.

In the above embodiment, the housing also includes at least one water outlet located on the housing between the open end and the closed end of the housing and directly connecting the water reservoir with the external environment through which the water is released or emitted. Located within the housing between the opened end and the closed end of the housing is an air channel connecting the opened end to the atmosphere.

In an alternative embodiment for sufficiently rigid containers, the water reservoir and associated water seal can be omitted, with the remainder of the device remaining substantially the same to allow water to be released or emitted directly into the soil.

The slow-release irrigation device also includes an air tube connecting the air channel to the interior of the blow molded beverage container and a permeable membrane located within the air tube with the permeable membrane controlling the passage of air through the air outlet.

An alternative embodiment of the present invention also comprises a slow-release irrigation device for plants that includes an enclosed container designed to accommodate larger volume such as for example tens to hundreds of liters of water.

The enclosed container is located on or partially embedded in a soil surface proximal to the plant being irrigated. It includes a rigid body, a fluid reservoir located within the container, a fluid filling port located proximal to a top end of the container and at least one housing fluid outlet located proximal to a bottom end of the container and directly connecting the fluid reservoir with the external environment through which the fluid is irrigated into the soil surface.

The slow-release irrigation device also includes a cap attachable to the fluid filling port and an air tube supported by the cap with the air tube having an air inlet located on the cap and an air outlet located within the fluid reservoir with the air tube connecting the fluid reservoir to the atmosphere. Located within the air tube is a permeable membrane that controls the passage of air through the air tube. The rate of dispensing of the fluid from the container into the soiled surface is controlled by changing the height between the air outlet and the housing fluid outlet.

BRIEF DESCRIPTION OF THE DRAWINGS

FIG. 1 is a front view showing an embodiment of a slow-release irrigation device for use with individual plants;

FIG. 2 is a front view showing slow-release irrigation device of FIG. 1 in use with a common blow molded container;

FIG. 3 is a cross-section view of the slow-release irrigation device shown in FIG. 2;

FIG. 6 is a partial cross-sectional view showing the use of the slow-release irrigation device of FIG. 5;

FIG. 7 is a cross-sectional view showing an alternative embodiment of a slow-release irrigation device specifically designed to accommodate tens to hundreds of liters of water.

DESCRIPTION OF THE PREFERRED EMBODIMENT

Figure 4:
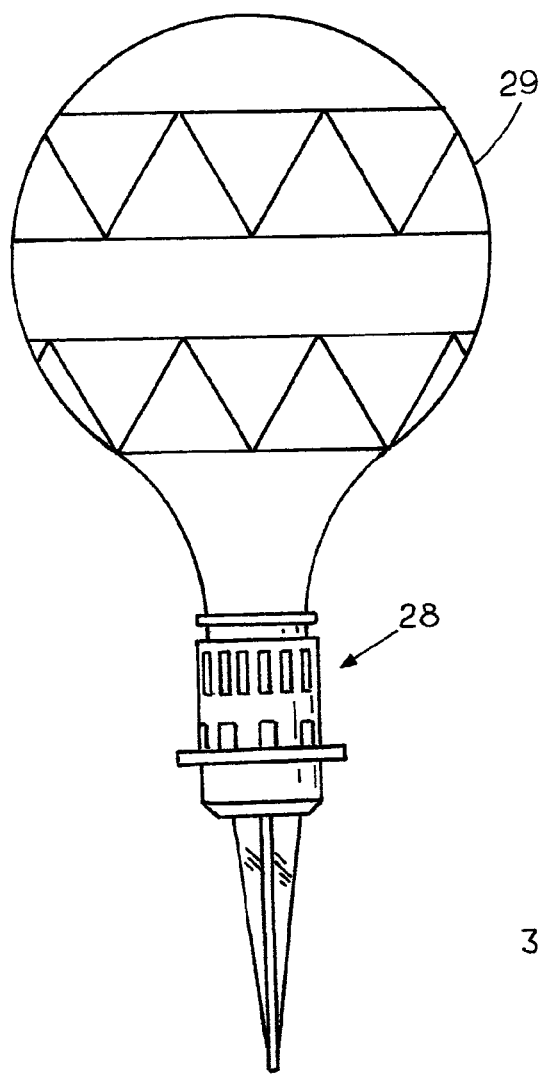
FIG. 4 shows an alternative embodiment of a slow-release irrigation device having an opaque ornamental fluid container.

The general purpose of the present invention, which will be described subsequently in greater detail, is to provide a slow-release irrigation device which may incorporate used or recycled common blow molded containers to assist in watering individual plants and more specifically, to automatically dispense water and nutrients required to sustain and grow a plant, at a rate that is adjustable to match the ability of the plant to extract the liquid from the soil. In general, the slow-release irrigation device of the present invention functions by utilizing the vacuum created by a water column pulling down on the impermeable top of a sealed container.

By supplying the water extremely slowly, it is possible to grow plants with extremely small quantities of water. Furthermore, the constant availability of water at root tips maximizes the rate of photosynthesis in the leaves, and subsequently the rate of growth of the plant.

There has thus been outlined the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the disclosing subject matter be regarded as including such equivalent constructions insofar as they do not depart from the spirit and scope of the present invention.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

In addition, the accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of any potential claims.

Referring to FIGS. 1, 2, and 3, FIG. 1 is a front view showing an embodiment of a slow-release irrigation device 10 for use with individual plants of the present invention. FIG. 2 is a front view and FIG. 3 is a cross-section view showing slow-release irrigation device 10 in use with a common blow molded container 15 such as a post-consumed or empty carbonated soft drink bottle made from polyethylene terephthalate (PET), or a water, beer, and wine bottle. Although FIGS. 2 and 3 shows slow-release irrigation device 10 in use with a common blow molded container 15, alternative embodiments of the present invention may be used with a variety of containers having different shapes and sizes and connection mechanisms.

Slow-release irrigation device 10 generally includes a cylindrical-shaped housing having an open end 12, a closed end 13, and a water reservoir 14 located within housing 11. Located proximal to the open end 12 of the housing 11 is a circumferential channel 16 which functions to provide a watertight engagement with a neck opening 17 of a common blow molded container 15. The circumferential channel 16 includes a threaded interior surface 23 designed to engage and mate in a water sealed manner with an exterior threaded surface 24 of the neck opening 17 of the common blow molded container 15 which are standardized across companies and across the globe.

Located and extending from the closed end 13 of the housing 11 is a housing anchor such as a spike 25 for securement of the housing 11 into a soil surface preferably proximal to a plant. The slow-release irrigation device 10 of FIGS. 1-3 also includes a support surface engaging rim 26 extending from an exterior surface of the housing 11 between the housing water outlet 19 and the closed end 13 of the housing 11 to assist in providing leveled support of the slow-release irrigation device 10 on the soil surface.

The housing 11 of slow-release irrigation device 10 includes a water channel 18 connected to the water reservoir 14 with water channel 18 having an inlet 18a for receiving water from an interior 15a of common blow molded container 15 into the water channel 18 and an outlet 18b for directing water from the water channel 18 into the water reservoir 14 with the outlet 18b simultaneously operating as a water seal for the housing 11.

Housing 11 also includes at least one and preferably a plurality of window or housing water outlet 19 located on the housing 11 between the open end 12 and the closed end 13 of housing 11 with the housing water outlet 19 directly connecting the water reservoir 14 with the external environment through which the water is emitted in order to provide water to a soil surface thereabout. It is noted that during use of slow-release irrigation device 10, the location of rim 26 extending from the exterior surface of the housing 11 between the housing water outlet 19 and the closed end 13 of the housing 11 will assist in preventing or reducing the likelihood of any if not all of the housing water outlet 19 from being submerged into the soil surface thereby reducing the likelihood of the housing water outlet 19 being obstructed by soil particles.

Housing 11 further includes an air channel 20 located within the housing 11 between the opened end 12 and the closed end 13 of the housing 11 and connecting the water reservoir 14 to the atmosphere and an air tube 21 connecting the air channel 20 to the interior 15a of the container 15 and a permeable membrane 22 located within the air tube 21 with the permeable membrane 22 controlling the passage of air from the air outlet 21a of air tube 21. Although permeable membrane 22 may be made from various types of material, in the embodiment of FIGS. 1-3 the permeable member 22 is made of an expanded polytetrafluoroethylene (PTFE). It is noted that a length of the air tube 21 located within the interior of the container may be adjustable and the air tube 21 may include a calibrated scale of length for setting and adjusting a rate of emission of air out of the air outlet 21a of air tube 21.

In the operation of slow-release irrigation device 10, when the blow molded container 15 is filled with liquid such as water or a combination of water and plant nutrient and attached to slow-release irrigation device 10 and inverted, the liquid enters the water channel inlet 18a under gravity and begins to flow to the water channel outlet 18b. As the water volume is lost from the blow molded container 15 the fixed quantity of air at the top of the blow molded container 15 expands, and the pressure within blow molded container 15 drops below atmospheric pressure. Within the container, the pressure at the air outlet 21a of the air tube 21, is dependent on the difference in height between the water level in the water reservoir 14 and the height of the air outlet 21a. The air tube 21 has a difference in pressure from its exit at the air outlet 21a where the pressure is below atmospheric to its inlet at the air channel 20 where the pressure is at atmosphere through the housing water outlets 19. The difference in pressure will promote an air flow through the air tube 21 from the atmosphere air channel 20 into the blow molded container 15 via air tube 21.

To regulate this airflow, a permeable membrane 22 such as of expanded PTFE in the air tube 21 restrains the passage of air at a controlled and known rate dependent on the differential pressure and the density, area and thickness of the membrane.

As the air enters the blow molded container 15 through the air outlet 21a an equivalent volume of water escapes through the water channel out 18b into the water reservoir 14 which will gradually fill with water. When the level reaches the base of the housing water outlets 19 the water will exit the slow-release irrigation device 10 and flow under gravity to the soil, where capillary action will distribute the water and make it available to the roots of the plant.

The purpose of the water reservoir 14 is to create a liquid seal that prevents air from flowing backwards up the water channel 18. Without the aforementioned feature, flexing of the walls of the blow molded container 15 may create and release vacuum, pulling air into the blow molded container 15 and resulting in premature emptying at an uncontrolled rate. However, with a sufficient small and or rigid container it is possible that the water reservoir 14 be omitted and that the water drops or is applied directly onto the soil.

A feature of the present invention is that the pressure within the air tube 21 above the permeable membrane 22 is dependent on the difference in height between the air outlet 21a of air tube 21 and the water exit at the housing water outlets 19. The aforementioned pressure remains constant even as the liquid level within the blow molded container 15 drops. As the differential pressure determines the air flow, which in turn meters the exit of water, this means that the slow-release irrigation device 10 emits or dispenses at a constant rate until the water level reaches the exit of the air outlet 21a of the air tube 21. This effectively means that the bottle emits at a constant and precise rate until nearly empty.

The rate of dispensing may be increased or reduced by increasing or reducing the length of the air tube 21. The air tube 21 may include a calibrated scale printed thereon so that the rate of emission and the time to empty the bottle can be easily set by the user.

As the air tube 21 is using the metering of air to control the flow or dispensing of water, the air tube 21 is inherently extremely tolerant to impurities in the water. In the case of very dirty water, heavier-than-water silt and particulates will separate over time in the neck of the inverted bottle, below the entrance to the water channel inlet 18a further increasing its tolerance to very dirty or muddy water. In extreme circumstances, the water channel inlet 18a may also be dimensioned so that it occupies most of the area of the neck to prevent blockage.

FIG. 4 shows an alternative embodiment of a slow-release irrigation device 28 having similar components to the slow-release irrigation device of FIGS. 1-3. However, instead of using the post-consumed container 15 of FIGS. 1-3 the slow-release irrigation device 28 uses an opaque ornamental fluid container 29 having similar general features to the post-consumed container 15. However, the ornamental design of fluid container 29 is ideal for the use of slow-release irrigation device 28 in an indoor environment for house plant since the fluid container 29 has the ability to conform to the inter décor of the indoor living space.

Figure 5:
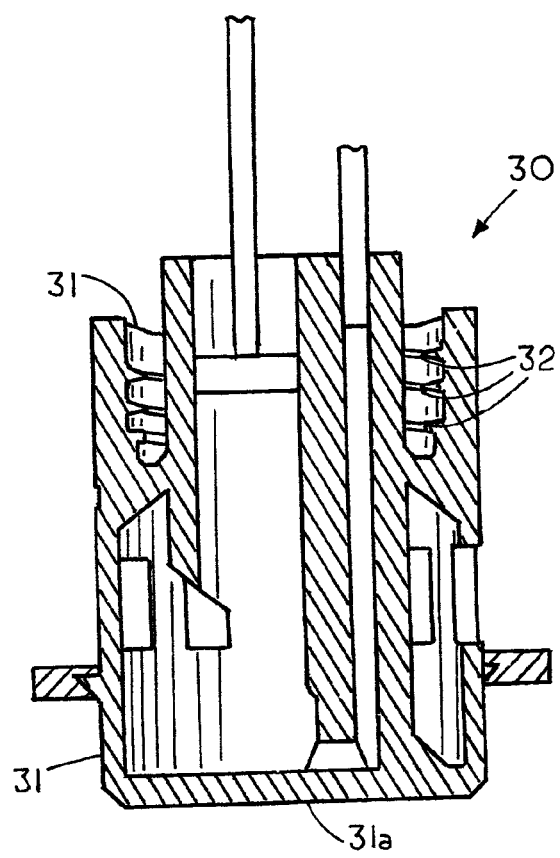
FIG. 5 is a cross-sectional view showing an alternative embodiment of a slow-release irrigation device.

Referring to FIGS. 5 and 6, FIG. 5 is a cross-sectional view showing an alternative embodiment of a slow-release irrigation device 30 and FIG. 6 is a partial cross-sectional view showing the use of slow-release irrigation device 30. Slow-release irrigation device 30 includes similar general components to the slow-release irrigation device 10 of FIGS. 1-3 with the aforementioned general components operating in a similar fashion. However, unlike the slow-release irrigation device 10 of FIGS. 1-3, slow-release irrigation device 30 is shown not including the use of a housing anchor such the spike 25 of slow-release irrigation device 10 for securement of a housing 31 into the soil surface.

However, one of the differences between slow-release irrigation device 30 and slow-release irrigation device 10 is that slow-release irrigation device 30 includes a circumferential channel 31 includes a plurality of flexible flaps 32, instead of threaded interior surface 23, which are designed to engage and mate with the exterior threaded surface 24 of the neck opening 17 of the common blow molded container 15 push-in engagement or a snap on manner to provide for a quick water tight engagement.

The slow-release irrigation device 30 also includes the use of an opaque cylindrical container 33 having an open end 34, a closed end 35 and an internal diameter "d" at least the same as an external diameter "$d_1$" of the common blow molded container 15 to enable opaque cylindrical container 33 to support the combination housing 31 and molded container 15 therein in a partial soil embedded condition during use to simultaneously prevent distortion of the molded container 15 under vacuum and algae growth due to exposure to light. In order to provide quick access to an interior 33a of opaque cylindrical container 33, the closed end 35 of opaque cylindrical container 33 may comprise a detachable cover 36.

In the use of slow-release irrigation device 30, an open-ended opaque cylindrical container 33 is partially buried in a preferably vertical position, adjacent to a plant and preferably in contact with a root ball, to act as a receptacle. The inverted molded container 15 may then be introduced into the uncapped or uncovered opaque cylindrical container 33 after which cover 36 engages opaque cylindrical container 33 to close off the end of opaque cylindrical container 33.

At the end of each irrigation cycle, the molded container 15 may be removed and replaced with a full molded container 15. The opaque cylindrical container 33 functions in 3 main ways, namely to constrain the molded container 15 and prevent distortion from the vacuum, to shield the molded container 15 from light to prevent algal growth, and to ease replacement of the empty molded container 15 with a full molded container 15.

It is noted that alternative embodiment of the present invention may include a slow-release irrigation device with an anchoring spike extending vertically from the closed end 31a of the housing 31 that is inserted into the soil to support the filled molded container 15. The aforementioned embodiment is particularly suitable for small bottles and house plants. In addition, molded container 15 may also be affixed to the main trunk of the plant in a fixture and either drip directly onto the root zone or have a tube that connects the outlet with the root zone.

It is also noted that the same fundamental principle of a permeable membrane used to meter air into a vessel utilizing the negative pressure of the water column, can also be used to design a device with a much larger volume than a post-consumer bottle allows.

Although the use of post-consumer soft drink bottles is attractive in terms of the use of waste and the low cost that this enables, there are application where a much larger reservoir of water is desirable, to allow a higher rate of emission along with longer intervals between replenishment. The same fundamental principle of operation as is used for the embodiments of FIG. 1-6 can be used in a device with a much larger volume.

FIG. 7 is a cross-sectional view showing an alternative embodiment of a slow-release irrigation device 37 specifically designed to accommodate larger volume devices of the present invention such as for example tens to hundreds of liters of water.

The slow-release irrigation device 37 includes an enclosed container 38 preferably having a rigid body located on or partially embedded in a soiled surface proximal to farmed vegetations.

The enclosed container 38 includes a fluid reservoir 39 located therein for supporting fluids such as water and a blend of water and plant nutrients, a fluid filling port 40 located proximal to a top end 38a of the container and at least one fluid outlet 43 located proximal to a bottom end 38b of the container 38 and directly connecting the fluid reservoir 39, including but not limited to via a water seal, with the external environment through which fluids supported within fluid reservoir 39 is irrigated into the soiled surface.

The slow-release irrigation device 37 is shown including a cap attachable 41 to the fluid filling port 40 and an air tube 42 supported by the cap 41. The air tube 42 includes an air inlet 42a located on the cap 41 and an air outlet 42b located within the fluid reservoir when the cap 41 is engaged with the fluid filling port 40 with the air tube 42 connecting the fluid reservoir 39 to the atmosphere.

The air tube 42 also includes a permeable membrane 44 located within the air tube 42 with the permeable membrane 44 controlling the passage of air through the air outlet 42b. A feature of the present invention is that the rate of dispensing of the fluid from the container 38 and more specifically, from fluid reservoir 39 into the soiled surface is controlled by changing a distance or height "H" between the air outlet 42b and the fluid outlet 43.

In the embodiment of FIG. 7, the fluid filling port 40 includes a neck 45 having external threads 45a and the cap 41 includes internal threads 41a mateable with the external threads 45a of the neck 45 to secure the cap 41 to fluid filling port 40 and support the air tube 42 within the fluid reservoir 39. The slow-release irrigation device 37 is shown to also includes a cover 46 engageable with the fluid filling port 40 to prevent environmental contaminants such as rainwater, dirt, rocks, and insects from blocking the permeable membrane 44.

In the use of slow-release irrigation device 37 container 38 is filled with a fluid such as water or a blend of water and plant nutrients through fluid filling port 40. Some loss of water will occur from the water exiting fluid outlet 43 as the container 38 is being filled, but the size of fluid outlet 43 is sufficiently small so the loss is limited and any water released will immediately be available to the irrigated vegetations.

Once the container 38 is filled, lower end of air tube 42, which is attached to cap 41, is inserted into the container 38 and the cap 41 is then secured to container 38 through the engagement of the internal threads 41a of cap 41 with the external threads 45a of the neck 45 as water within container 38 continues to flow out of the fluid outlet 43. As the volume of water is lost, a vacuum will be created and will progressively increase in a headspace 47 until the vacuum prevents further water emission through fluid outlet 43. As with the devices of FIGS. 1-6, at any specific point in the water the pressure will be lower than atmospheric and will be dependent solely on the difference in height between that point and the fluid outlet 43.

At the air outlet of 42b of air tube 42, the lower-than-atmospheric pressure will draw air through the air tube 42, and through the permeable membrane 44. Each volume unit of air drawn into the slow-release irrigation device 37 will allow the emission of an equivalent volume of liquid.

As long as the water remains above the air outlet of 42b the pressure at that point is dependent only on the difference in height "H" between the air outlet of 42b and the fluid outlet 43, regardless of the water level. The rate of emission will also remain constant until the water level fluid outlet 43, after which water within container 38 will slowly reduce via fluid outlet 43 until the container 38 is empty. The length of the air tube 42 may be calibrated and marked so that the emission rate can be set and adjusted as necessary by the user.

I claim:

1. A slow-release irrigation device for individual plants comprising:
   a housing having an open end, a closed end, and a water reservoir located therein;
   a circumferential channel located proximal to the open end of the housing, the circumferential channel providing a watertight engagement with a neck opening of a common blow molded container for soft drinks, water, beer, and wine;
   a water channel connected to the water reservoir, the water channel having an inlet for receiving water into the water channel and an outlet for directing water from the water channel into the water reservoir with the outlet simultaneously operating with the water reservoir as a water seal for the housing that prevents air from flowing backwards up into the water channel;
   at least one housing water outlet located on the housing between the open end and the closed end and directly connecting the water reservoir with the external environment through which the water is emitted;
   an air channel located within the housing between the opened end and the closed end of the housing;
   an air tube connecting the water reservoir to an interior of the container; and
   a permeable membrane located within the air channel with the permeable membrane controlling the passage of air through the air tube.

2. The slow-release irrigation device for individual plants of claim 1 wherein the permeable member is made of an expanded polytetrafluoroethylene.

3. The slow-release irrigation device for individual plants of claim 1 wherein the circumferential channel includes a threaded interior surface mateable with an exterior threaded surface of the neck opening of the common blow molded container.

4. The slow-release irrigation device for individual plants of claim 1 wherein a length of the air tube located within the interior of the container is adjustable with the air tube including a calibrated scale of length for setting and adjusting a rate of emission.

5. The slow-release irrigation device for individual plants of claim 1 wherein the housing includes a spike extending from the closed end for securement into a soil surface proximal to a plant.

6. The slow-release irrigation device for individual plants of claim 1 wherein the circumferential channel includes a plurality of flexible flaps engageable with an exterior threaded surface of the neck opening of the common blow molded container in a snap on manner.

7. The slow-release irrigation device for individual plants of claim 1 including an opaque cylindrical container having an open end and a closed end and an internal diameter at least the same as an external diameter of the common blow molded container, the opaque cylindrical container supporting the housing and the common blow molded container in a partial soil embedded condition during use to simultaneously prevent distortion of the common blow molded container under vacuum and algae growth due to exposure to light.

8. The slow-release irrigation device for individual plants of claim 1 including a support surface engaging rim extending from an exterior surface of the housing between the at least one housing water outlet and the closed end of the housing.

9. A slow-release irrigation device for individual plants comprising:
   an opaque fluid container having a rigid body and a screw cap filling port;
   a housing having an open end, a closed end, and a water reservoir located therein;
   a circumferential channel located proximal to the open end of the housing, the circumferential channel providing a watertight engagement with a surface of the screw cap filling port of the opaque fluid container;
   a water channel connected to the water reservoir, the water channel having an inlet for receiving water into the water channel and an outlet for directing water from the water channel into the water reservoir changed to with the outlet simultaneously operating with the water reservoir as a water seal for the housing that prevents air from flowing backwards up into the water channel;
   at least one housing water outlet located on the housing between the open end and the closed end and directly connecting the water reservoir with the external environment through which the water is emitted;
   an air channel located within the housing between the opened end and the closed end of the housing and connecting the water reservoir to the atmosphere;
   an air tube connecting the water reservoir to an interior of the container; and
   a permeable membrane located within the air channel with the permeable membrane controlling the passage of air through the air channel.

10. The slow-release irrigation device for individual plants of claim 9 wherein the permeable member is made of an expanded polytetrafluoroethylene.

11. The slow-release irrigation device for individual plants of claim 10 wherein a length of the air tube located within the interior of the container is adjustable with the air tube including a calibrated scale of length for setting and adjusting a rate of emission.

12. The slow-release irrigation device for individual plants of claim 11 wherein the housing includes a spike extending from the closed end for securement into a soil surface proximal to a plant.

13. The slow-release irrigation device for individual plants of claim 12 including a support surface engaging rim extending from an exterior surface of the housing between the housing water outlet and the closed end of the housing.

14. The slow-release irrigation device for individual plants of claim 13 wherein the circumferential channel includes a threaded interior surface mateable with an exterior threaded surface of the screw cap filling port of the opaque fluid container.

15. The slow-release irrigation device for individual plants of claim 13 wherein the circumferential channel includes a plurality of flexible flaps engageable with an exterior threaded surface of the screw cap filling port of the opaque fluid container.

16. The slow-release irrigation device for individual plants of claim 13 wherein the opaque fluid container includes an ornamental shape and design.

17. The slow-release irrigation device for individual plants of claim 11 including an opaque cylindrical container having an open end and a closed end and an internal diameter at least the same as an external diameter of the opaque fluid container, the opaque cylindrical container supporting the housing and the common blow molded container in a partial soil embedded condition during use to simultaneously prevent distortion of the common blow molded container under vacuum and algae growth due to exposure to light.

\* \* \* \* \*